Jan. 5, 1954 E. E. POWELL 2,664,791
MANUAL INDEXING MECHANISM
Filed Jan. 5, 1949 4 Sheets-Sheet 1
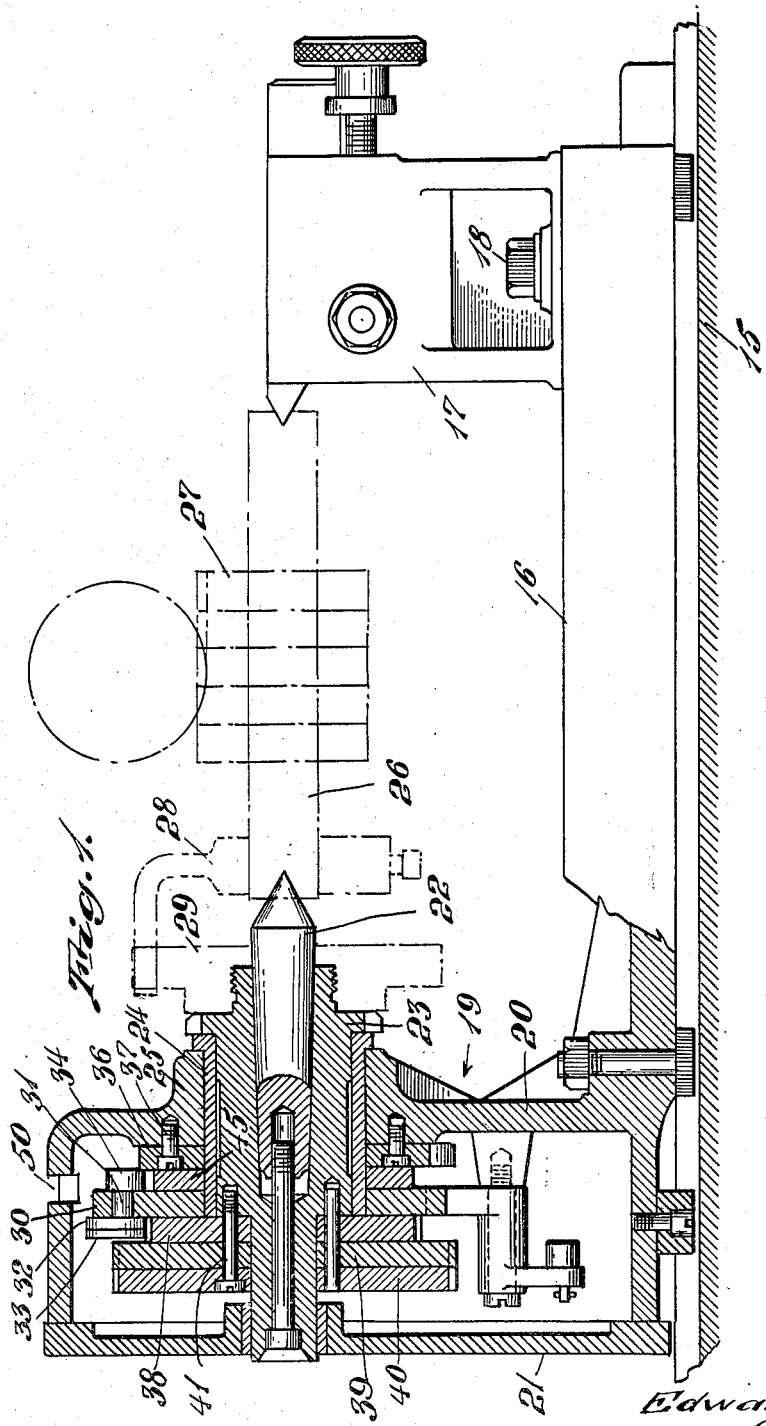
INVENTOR
Edward E. Powell
BY Barlow & Barlow
ATTORNEYS

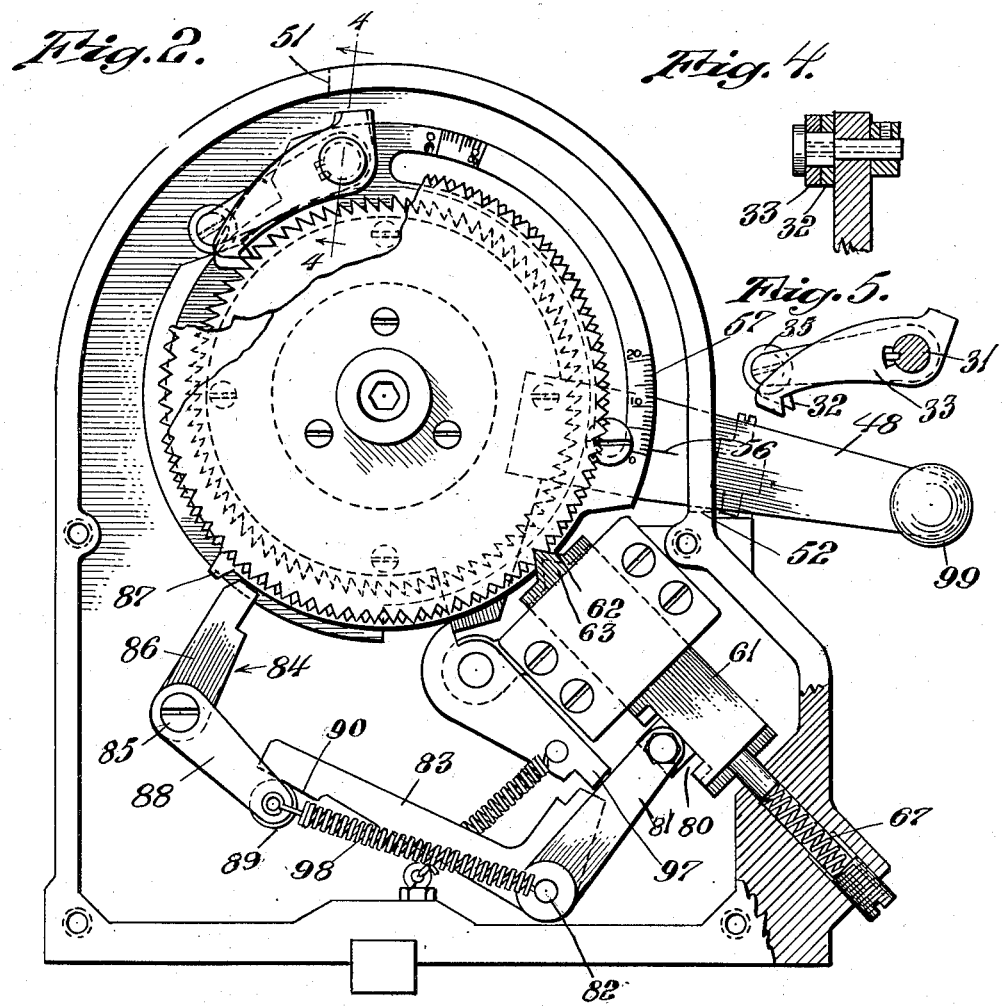
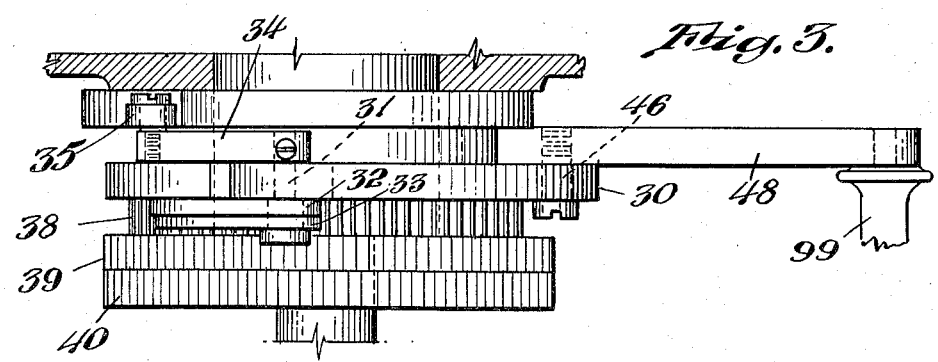

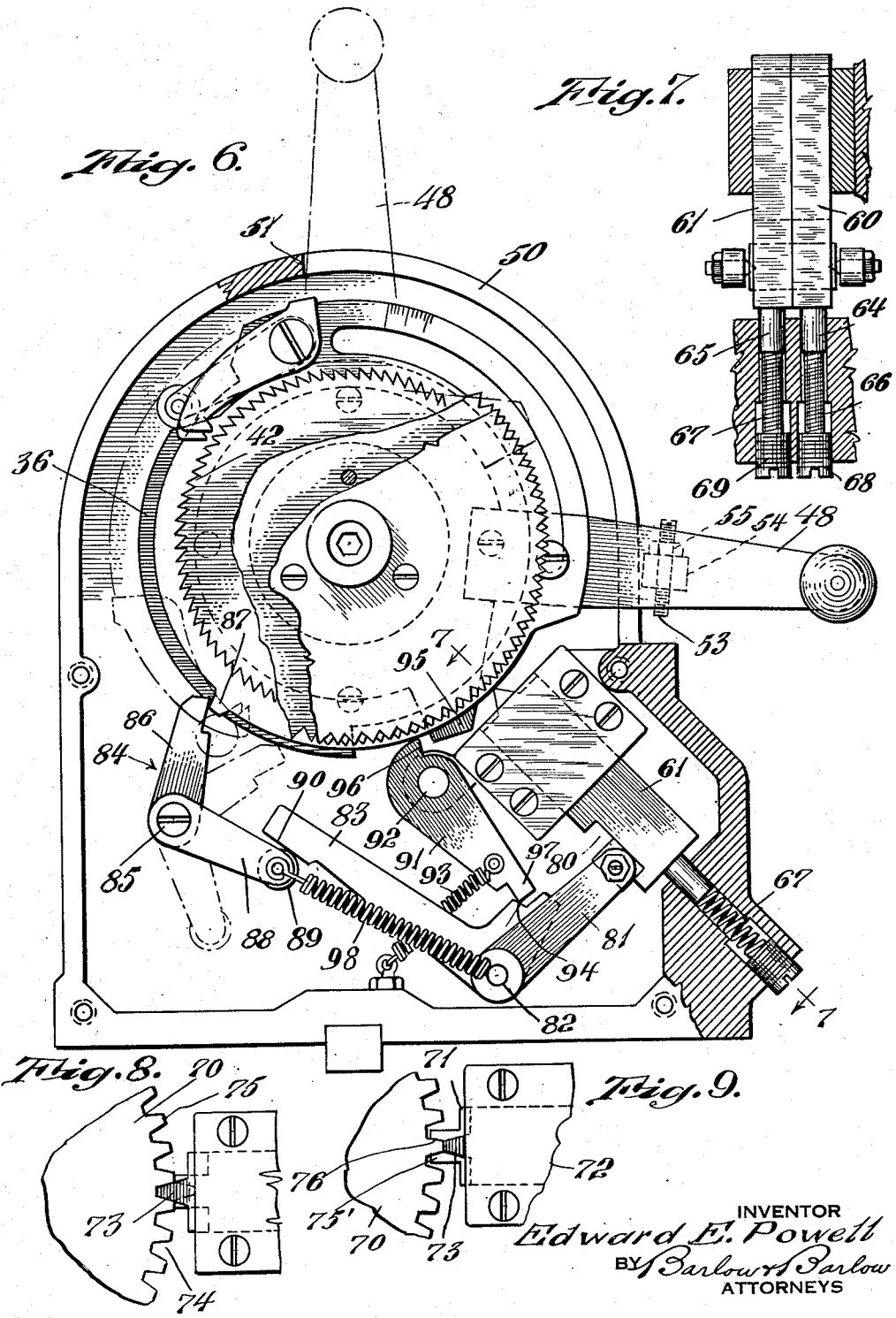

Jan. 5, 1954  E. E. POWELL  2,664,791
MANUAL INDEXING MECHANISM
Filed Jan. 5, 1949  4 Sheets-Sheet 4
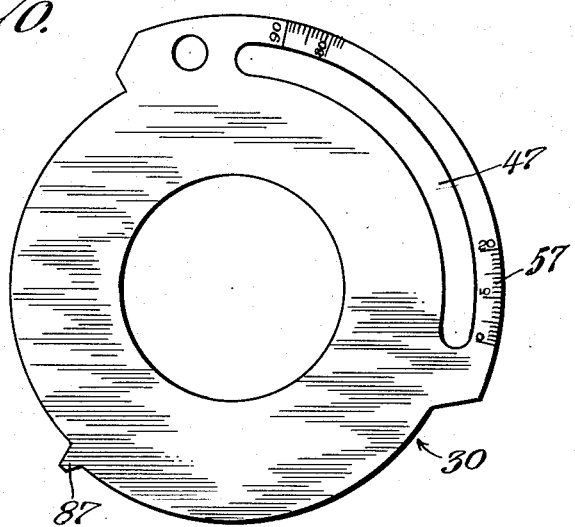
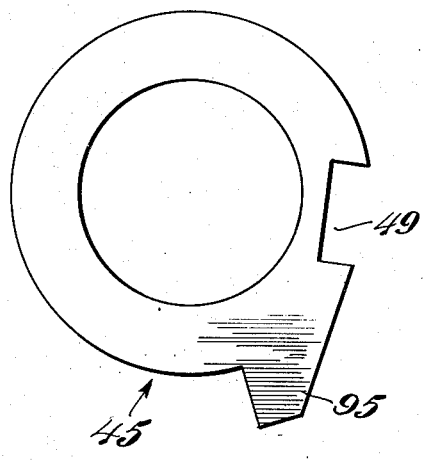
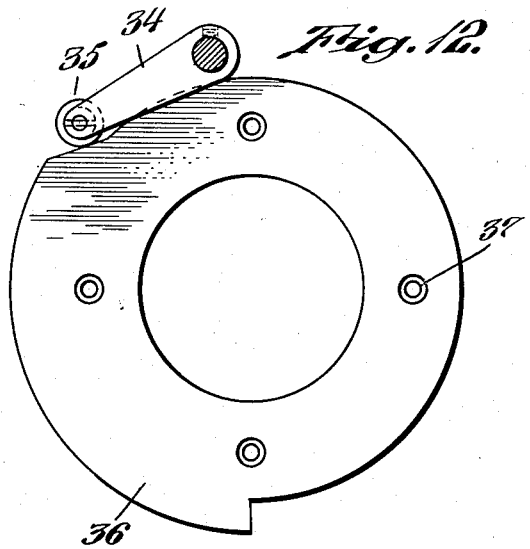
INVENTOR.
Edward E. Powell
BY Barlow & Barlow
ATTORNEYS.

Patented Jan. 5, 1954

2,664,791

UNITED STATES PATENT OFFICE 2,664,791

MANUAL INDEXING MECHANISM

Edward E. Powell, Conimicut, R. I.

Application January 5, 1949, Serial No. 69,317

15 Claims. (Cl. 90—56)

This invention relates to a manual indexing mechanism for rotating work through certain angular portions of a circle that different portions of the work may be presented to some cutting tool.

Indexing mechanisms which are usually provided on machine tools require careful handling for indexing and are of a more or less complicated construction.

One of the objects of this invention is to provide an indexing mechanism for a rotatably mounted piece of work which after setting may be simply manually operated by merely pulling a lever.

Another object of this invention is to provide an indexing mechanism in which very fine angular movements may be provided throughout the entire circle of 360 degrees.

Another object of this invention is to provide a ratchet for indexing and utilizing a relatively large ratchet tooth for the fine indexing which is provided, whereby the tooth may be strong and not easily broken.

Another object of this invention is to provide a locking mechanism for the work enabling the work to be locked in the large number of positions corresponding with the different positions to which the ratchet mechanism may enable the work to be fed.

Another object of this invention is to provide a sturdy locking mechanism and yet one in which a large number of locking positions may be had.

Another object of this invention is to utilize the teeth of a gear as well as the spaces between the teeth for locking the work in position whereby a multiple of the distances between gear teeth may be had for different positions of locking of the work.

Another object of the invention is to provide a mechanical means for releasing the lock just prior to the engagement of the pawls with the ratchet, for feeding and a return of the locking means for holding the work at the end of the indexing stroke of the hand mechanism.

With these and other objects in view, the invention consists of certain novel features of construction, as will be more fully described and particularly pointed out in the appended claims.

In the accompanying drawings:

Fig. 1 is an elevation partly in section illustrating the work in dot dash lines as positioned in the work holding unit and showing the ratchet feeding mechanism in section;

Fig. 2 is an end view with the casing cover partly broken away better to illustrate the operating parts of the device;

Fig. 3 is a top plan view of the structure shown in Fig. 2 with the casing omitted;

Fig. 4 is a sectional view on substantially line 4—4 of Fig. 2;

Fig. 5 is a perspective view of the pawls and their mounting arm;

Fig. 6 is a view similar to Fig. 2 illustrating the locking mechanism in withdrawn position and also illustrating in dotted lines a different position of the handle and its associated mechanism;

Fig. 7 is a sectional view on line 7—7 of Fig. 6;

Fig. 8 is a fragmental view illustrating a modified form of holding device for the gears;

Fig. 9 is a view similar to Fig. 8 but showing the holding device in a different position on the gear;

Fig. 10 is a plan view of the rockable member of the indexing mechanism;

Fig. 11 is a plan view of the handle mounting member which is associated with the rockable member;

Fig. 12 is a plan view of the cam which is fixed in relation to the rotary member of the mechanism and illustrating also the follower which is mounted upon the pawl actuating shaft.

In proceeding with this invention, I mount upon a rotary work holder a rockable member which may swing freely with reference to the axis of the work holding member. This member carries a pawl which is controlled in its movement by a cam which is fixed relative to the work holding member. This pawl engages a ratchet which is fixed to the work holding member so that when the pawl engages the ratchet the work holding member will be rotated about its axis. The work holding member also carries a locking means which consists of one or two gears, the teeth of which are engaged for holding the work holding member in position. The handle which is adjustable relative to the rockable member moves through a certain fixed stroke and by reason of its adjustable connection to the rockable member will determine the point of engagement of the pawls with the ratchet so that the angular movement of the work may be adjusted. A scale is provided which will predetermine this adjustment for different angular movements of the work. Thus, it becomes necessary only to swing the handle through a complete stroke for indexing the work a predetermined amount.

With reference to the drawings, 15 designates a suitable support upon which a bed 16 is mounted. The bed 16 has a tailstock 17 at one end thereof which is adjustable on the bed 16 and held in position by the bolt 18. The head stock designated generally 19 contains the indexing mechanism which is the subject of this invention within a casing designated 20 having a removable cover 21. A centering spindle 22 is mounted in a holder 23 rotatably mounted in a bushing 24 which is fixed to the casing boss 25.

The work arbor is designated 26 mounting thereon work 27, the arbor being locked to the work support by means of a dog 28 engaging a flange member 29. In order that the work may be turned certain fixed angular amounts, this work holder designated 23 is turned through these angular amounts by the index mechanism which will now be described.

A rockable member 30 shown by itself in Fig. 10 is rotatably mounted upon the outer surface of the fixed bushing 24 and carries a pivot 31 which has pawls 32 and 33 thereon while on its opposite end a lever 34 is carried (see Figs. 3 and 12) which has at its end an offset follower wheel 35. This wheel 35 engages the cam 36 which is fixed to the casing 20 by bolts 37 so that as the member 30 is rotated with reference to the cam, the pawls will be controlled in their movement. A ratchet wheel 38 is fixed to the work holder 23 in a plane to be engaged by the pawls 32 and 33 and also gears 39 and 40 are fixed to the work holder 23 by means of the bolts 41.

The pawls 32 and 33 have their engaging ends a distance apart substantially one half the distance between ratchet teeth 42 and are of a thickness together substantially less than the thickness of the ratchet wheel 38 as shown in Fig. 3 so that one of these pawls will engage a ratchet tooth even though the movement of the pawls is but one half the distance of the ratchet tooth and thus I may obtain adjustments by reason of two pawls twice the number of divisions of angular distance that there are ratchet teeth in the wheel, or should I utilize more pawls I would obtain such multiple of the divisions of 360 degrees of the ratchet teeth depending upon the number of pawls which were utilized.

In order to rock the member 30, I have provided a member designated generally 45 which is rockably mounted upon the bushing 24 and is secured to the rockable member 30 by means of a screw 46 (see Fig. 3) which passes through the slot 47 in the member 30 and extends into a handle 48 which fits in the notch 49 of the member 45. Thus, this screw secures the handle in position in the notch 49 and also secures the members 30 and 45 in a definite relative position which may be adjusted in order to adjust the engagement of the pawls with the ratchet. The handle 48 moves in a slot 50 in the casing 20 through 90 degrees. In its up position the handle will engage the casing at a stop 51 (see Figs. 2 and 6) while in its lower position (see Fig. 2) it will engage the casing at a stop 52. In order to adjust the throw of the handle, an abutment pin 53 is threadedly mounted in a boss 54 on the handle and may be held in position by a check nut 55. If it is desired that this handle shall index the work through a certain number of degrees at each rotation, the datum line 56 on the handle (see Fig. 2) will be set opposite the required number of degrees which appear on the scale 57 on the member 30 so that this number of degrees will be the amount of indexing at each stroke of the handle.

In order to lock the work holder in position, I have provided in the showings in Figs. 1–7 a pair of gears 39 and 40 of equal number of teeth with the teeth of one gear overlying the spaces between the teeth of the other gear. Locking members 60 and 61 carry projections 62 and 63 and are forced toward the gears by means of plungers 64 and 65 pressed by springs 66 and 67 and the tension of which is adjustable by threaded members 68 and 69. One of these projections will enter between the teeth of one of the gears and maintain the work holder in adjusted position. The other of the projections will engage the tooth end of one of the gears and will remain retracted from entering its locking position.

Alternatively instead of using two gears and two members which have just been described, I may use one gear as shown in Figs. 8 and 9 designated 70 and two members designated 71 and 72 for engaging this single gear. The member 72 will have a projection 73 which will enter the space 74 between the gear teeth 75 of the gear 70 to lock the gear in one position while the member 71 will have a projection 75 providing a socket 76 to receive a tooth 75 to lock the gear in position. The center line of the projection 73 and of the socket 76 will be on the same radial line from the center of the gear 70. Thus only one of these members will lock the gear and work holder in position at a time but by reason of one of them engaging a tooth and the other engaging the space between the teeth, I may multiply the different positions of locking of this gear so that I may obtain twice the number of locking positions as I have gear teeth in the gear 70.

It is desirable that the locking members shall be retracted from the gear which they lock at the time of indexing. Accordingly, I have provided in these members 60 and 61 a recess shown in Figs. 2 and 6 at 80 while a lever having an arm 81 and pivoted at 82 with another arm 83 is provided and so located that the arm 81 will extend into this recess and movement of the arm will cause retraction of the members 61 and 62 or 71 and 72 as the case may be. A second crank lever designated generally 84 pivoted as at 85 has an arm 86 so disposed that the projection 87 on the rockable member 30 will engage the arm 86 so that when this projection 87 is rocked counterclockwise the arm 86 will be swung about its pivot 85 and the arm 88 having a roller 89 will press against the abutting surface 90 of the lever 83 and swing this lever 83 so as to move the arm of the lever 81 clockwise and withdraw the members 61 and 62, or 71 and 72 as the case may be, upon a clockwise movement of the handle and member 30.

As the lever 81, 83 is rocked to withdraw the locking members, an arm 91 pivoted as at 92 is drawn by spring 93 into a notch 94 of a portion carried by the lever 81, 83 so as to lock the members against the action of their returning spring 67 and maintain these members in unlocking position.

Upon movement of the handle from the up, dotted line position shown in Fig. 6 to the lower position shown in full lines in Fig. 6, the projection 95 will engage the abutment 96 on the arm 91 and swing this arm so as to withdraw its end 97 from the notch 94, thus permitting the lever 83 to return to the position shown in Fig. 2 by reason of the springs 66 and 67 forcing the members 60 and 61 back into locking position. The projection 87 is so related to the pawls that the arm 86 is engaged just prior to the time that the cam follower will permit the pawls to engage the ratchet. On the upward stroke of the arm, the projection 87 may pass from the position shown in Fig. 2 to the position on the other side of the lever 84 by the independent swinging of this lever as shown in dotted line position in Fig. 6 from which position it will be returned by spring 98.

In operation, assuming that an index has been completed and the work treated with the tool and it is desired to perform another index, the handle 49 is engaged by its gripping portion 99 and will be swung from the position shown in Fig. 2 or Fig. 6 to the dotted line position vertically upwardly as shown in Fig. 6. During this movement, the pawls will be drawn out of engagement with the ratchet as the follower 35 rides up on the cam surface 36. The adjustment of the handle as shown in Figs. 2 and 6 is for a very small index movement. The handle will then be rotated clockwise as shown in Fig. 6 from its vertical position downwardly and at a point just before it reaches the completion of a stroke the roll 35 will move off of the raised cam surface 36 permitting the pawls to move into engagement with the ratchet and for the remaining short distance of throw of the handle the rockable member will cause the ratchet to move and turn the work through this very small angular distance. It will be readily apparent that this distance could be adjusted to be any part of 90 degrees by adjustment of the member 45 with reference to the member 30.

With relation to the unlocking, as the handle is raised from the full line position in Fig. 6 to the dotted line position, the projection 87 will be moved from the position shown in Fig. 2 to a position substantially 90 degrees therefrom which will be close to the engagement of the locking projections, the arm 84 being swung to the dotted line position as shown in Fig. 6 during the passage of this projection 87. The parts remain locked, however, until the handle is at a position close to the point at which the pawls will engage the ratchet which is the position shown in Fig. 6, and the projection 87 engages the crank arm 84 to swing it counterclockwise and move the lever 81, 83 clockwise to withdraw the locking members. The work is then indexed through the angular movement which is required and at just the completion of this angular movement the dog 95 engages the locking arm 91 to release the withdrawing lever 81, 83 and permit the locking members to again move into position to lock the work holder, thus completing the cycle of operation.

I claim:

1. A manual index for a rotary work holder comprising a ratchet secured to said holder, a rockable member mounted for free rotative movement about the axis of said holder, a handle adjustably secured to said member, spaced stop means between which said handle moves to provide a limited arc of swing of said handle, a pawl carried by said member to engage said ratchet and move the work holder in one direction, and a cam fixed with relation to said member to control the engagement of said pawl with said ratchet during the arc of movement of the handle; said member being adjustable relative to said handle to vary the position of said pawls relative to cam.

2. A manual index as set forth in claim 1 wherein means are provided which are responsive to the movement of said handle for locking and unlocking said work holder.

3. A manual index as set forth in claim 1 wherein a plurality of pawls are provided set an even division of the distance of the teeth of said ratchet apart whereby the index may be divided into divisions which are a multiple of the number of ratchet teeth provided.

4. A manual index as set forth in claim 1 wherein said member may be adjustably secured to said handle to vary the position of swing of said member with reference to said cam.

5. A manual index as set forth in claim 1 wherein means which lock the work holder in position release said work holder just prior to the engagement of said pawls with the ratchet and engage said work holder at the completion of the stroke of said handle.

6. An index for a rotary work holder comprising a ratchet wheel for turning said holder, a rockable member mounted for free rotative movement about the axis of said ratchet wheel, a pawl carried by said member to engage said ratchet wheel and move the work holder in one direction, a cam fixed relative to said member to control the engagement of said pawl with said ratchet wheel, a manual operable handle mounted for free rotative movement about the axis of said ratchet wheel for movement in an arc of fixed angular distance, means for adjustably securing said member to said handle for movement therewith and for varying the position of said pawl relative to said handle, for varying the extent of movement of said ratchet wheel by said pawl at each oscillation of said handle.

7. An index as set forth in claim 6 wherein said handle has a datum line and said member has a graduated scale thereon movable with said member into registry with said datum line to preset the relative position of said member and handle.

8. An index for a rotary work holder comprising a ratchet wheel for turning said holder, a rockable member mounted for free rotative movement about the axis of said ratchet wheel, a pawl carried by said member to engage said ratchet wheel and move the work holder in one direction, a cam fixed relative to said member to control the engagement of said pawl with said ratchet wheel, a manual operable handle mounted for free rotative movement about the axis of said ratchet wheel for movement in an arc of fixed angular distance, means for adjustably securing said member to said handle for movement therewith and for varying the position of said pawl relative to said handle, for varying the extent of movement of said ratchet wheel by said pawl at each oscillation of said handle and lock means for holding said work holder against rotation between the indexing thereof.

9. An index for a rotary work holder comprising a ratchet wheel for turning said holder, a rockable member mounted for free rotative movement about the axis of said ratchet wheel, a pawl carried by said member to engage said ratchet wheel and move the work holder in one direction, a cam fixed relative to said member to control the engagement of said pawl with said ratchet wheel, a manual operable handle mounted for free rotative movement about the axis of said ratchet wheel for movement in an arc of fixed angular distance, means for adjustably securing said member to said handle for movement therewith and for varying the position of said pawl relative to said handle, for varying the extent of movement of said ratchet wheel by said pawl at each oscillation of said handle, lock means for holding said work holder against rotation between the indexing thereof, and means carried by said member operable for moving said lock means out of locking engagement.

10. An index as set forth in claim 9 wherein said means carried by said member is a projection extending radially from said member.

11. An index for a rotary work holder comprising a ratchet wheel for turning said work holder, a pawl for engaging and indexing said ratchet wheel, manual operable means for oscillating said pawl embodying a rockable member movable in an arc of fixed angular distance, a separate cam, means to hold said cam stationary fixed in position relative to said ratchet wheel and said member for controlling the engagement of said pawl with said ratchet wheel and means for angularly adjusting the position of said member relative to said cam for varying the position of said pawl relative to said cam to vary the extent of movement of said ratchet wheel by said pawl at each oscillation of said member.

12. An index as set forth in claim 11 wherein said rockable member is a disk mounted for free rotative movement about the axis of the index wheel.

13. An index as set forth in claim 11 wherein said pawl is mounted on a pivot carrying a roller engageable with said cam for swinging said pawl in and out of engagement with said ratchet wheel.

14. An index as set forth in claim 11 wherein said ratchet wheel, rockable member, and cam are mounted side by side with their center concentric with the axis of said work holder.

15. An index as set forth in claim 11 further comprising a disk movably mounted for rotative movement about the axis of said ratchet wheel and carrying a manually operable handle adjustably secured to said rockable member.

EDWARD E. POWELL.

References Cited in the file of this patent

UNITED STATES PATENTS

| Number | Name | Date |
| --- | --- | --- |
| 1,404,243 | Stewart et al. | Jan. 24, 1922 |
| 1,660,502 | Gleason et al. | Feb. 28, 1928 |
| 2,225,426 | Aronson | Dec. 17, 1940 |
| 2,352,489 | Melin | June 27, 1944 |
| 2,386,880 | Osplack | Oct. 16, 1945 |
| 2,407,696 | Webster | Sept. 17, 1946 |
| 2,407,840 | Leonard | Sept. 17, 1946 |